United States Patent
Scharf et al.

(10) Patent No.: US 8,376,332 B2
(45) Date of Patent: Feb. 19, 2013

(54) ELASTOMER METAL ELEMENT FOR AN ELASTOMER METAL BEARING, PARTICULARLY AS A BEARING CONNECTION BETWEEN A DOME MODULE AND A VEHICLE

(75) Inventors: Lothar Scharf, Bad Sooden-Allendorf (DE); Oliver Lippke, Remseck (DE); Bernd Zawadzki, Schwaikheim (DE)

(73) Assignee: Hübner GmbH, Kassel (DE)

( * ) Notice: Subject to any disclaimer, the term of this patent is extended or adjusted under 35 U.S.C. 154(b) by 589 days.

(21) Appl. No.: 12/594,830

(22) PCT Filed: Mar. 31, 2008

(86) PCT No.: PCT/EP2008/002559
§ 371 (c)(1),
(2), (4) Date: Apr. 1, 2010

(87) PCT Pub. No.: WO2008/122380
PCT Pub. Date: Oct. 16, 2008

(65) Prior Publication Data
US 2011/0164839 A1 Jul. 7, 2011

(30) Foreign Application Priority Data
Apr. 7, 2007 (DE) .................. 10 2007 016 741

(51) Int. Cl.
*B60G 11/22* (2006.01)
(52) U.S. Cl. .............. 267/281; 267/141.2; 267/279; 267/293; 384/222
(58) Field of Classification Search ............... 267/140, 267/293, 219, 220, 140.12, 141.2, 27, 29, 267/273, 279, 281; 384/220, 222; 280/124.166, 124.169; 403/220, 221, 222
See application file for complete search history.

(56) References Cited

U.S. PATENT DOCUMENTS
2,048,256 A * 7/1936 Geyer ........................ 403/228
(Continued)

FOREIGN PATENT DOCUMENTS
DE 2337872 A1 2/1975
DE 1955308 B * 10/1977
(Continued)

*Primary Examiner* — Robert A Siconolfi
*Assistant Examiner* — Mariano Sy
(74) *Attorney, Agent, or Firm* — Gifford, Krass, Sprinkle, Anderson & Citkowski, P.C.

(57) ABSTRACT

The invention relates to an elastomer metal element for an elastomer metal bearing, particularly as a bearing connection between a dome module and a vehicle, with an inner cylindrical metal part (2) for connection to a first structural element which is to be supported, with two outer sheet metal shell parts (4, 5; 4', 5') lying opposite each other and partly overlapping the inner cylindrical metal part, and with elastomer bodies (6, 7, 8, 9) adhering between the inner metal part (2) and the sheet metal shell parts (4, 5; 4', 5'), wherein the elastomer metal element (1), with the application of a radial tensioning in the elastomer bodies (6, 7, 8, 9), can be pressed into an accommodating eye (19) at a second structural element which is to be supported. According to the invention, a twisting stop (16, 17 with 13, 20) is provided which, above a certain stop release moment, up to which the elastomer metal bearing (1) has a relatively high torsional stiffness with approximately linear torsional spring characteristics, can be pressed over with the release of the stop support, as a result of which a further torsional deflection with horizontal or declining spring characteristics is absorbed.

10 Claims, 5 Drawing Sheets

U.S. PATENT DOCUMENTS

| | | | |
|---|---|---|---|
| 2,051,864 A | | 8/1936 | Knox |
| 2,915,306 A | * | 12/1959 | Hickman ................ 267/280 |
| 3,666,301 A | * | 5/1972 | Jorn ........................ 403/228 |
| 3,730,462 A | | 5/1973 | Dick |
| 4,183,496 A | * | 1/1980 | Brock et al. ............. 248/638 |
| 4,655,614 A | * | 4/1987 | Schott ...................... 384/220 |
| 5,439,203 A | | 8/1995 | Hadano |
| 5,865,429 A | * | 2/1999 | Gautheron .............. 267/141.7 |
| 6,241,225 B1 | * | 6/2001 | Krause ..................... 267/292 |
| 6,513,801 B1 | * | 2/2003 | McCarthy ................ 267/293 |
| 6,854,723 B2 | * | 2/2005 | Ogawa et al. ............ 267/293 |
| 7,229,088 B2 | * | 6/2007 | Dudding et al. ....... 280/124.17 |
| 7,441,759 B2 | * | 10/2008 | Franke et al. ............ 267/282 |
| 7,464,919 B2 | * | 12/2008 | Hermann et al. ......... 267/220 |
| 7,748,689 B2 | * | 7/2010 | Thibault et al. ........ 267/140.12 |

FOREIGN PATENT DOCUMENTS

| | | | | |
|---|---|---|---|---|
| DE | 4215627 | C1 | 5/1993 | |
| EP | 382645 | A1 * | 8/1990 | ............ 267/201 |
| GB | 2018948 | A * | 10/1979 | |
| JP | 3157526 | A * | 7/1991 | ........... 267/140.12 |

* cited by examiner

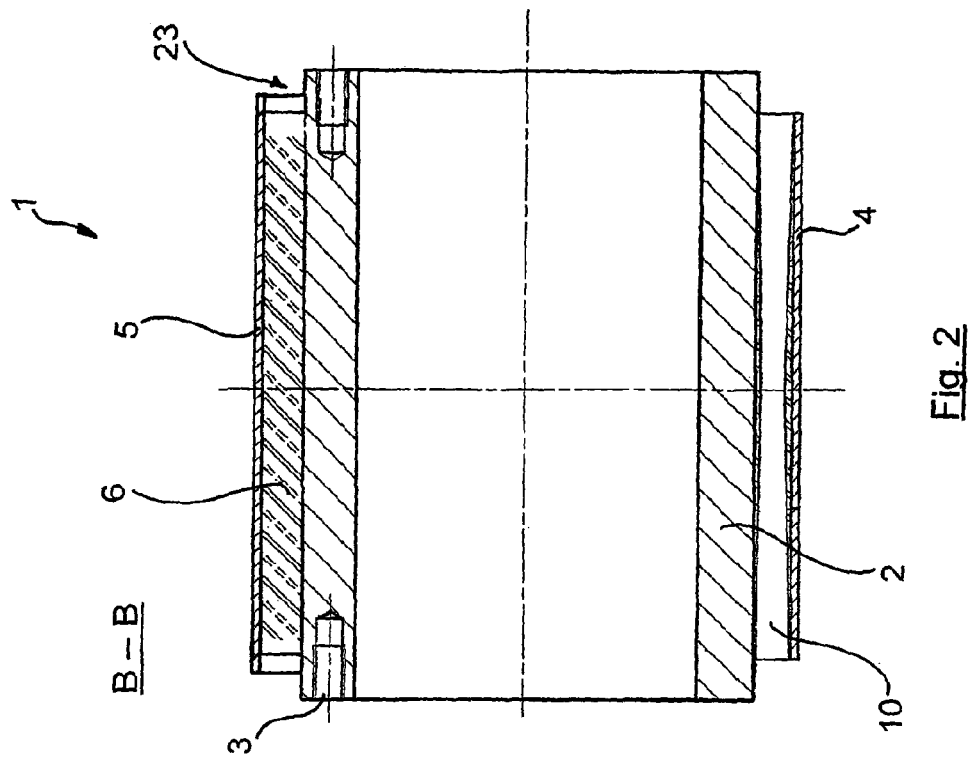
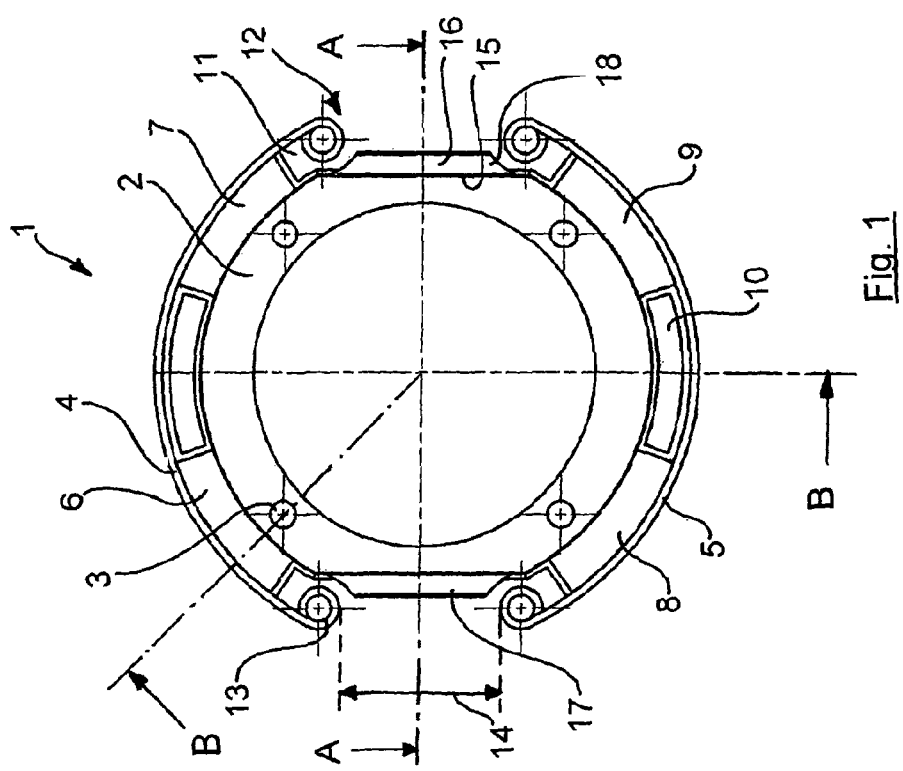

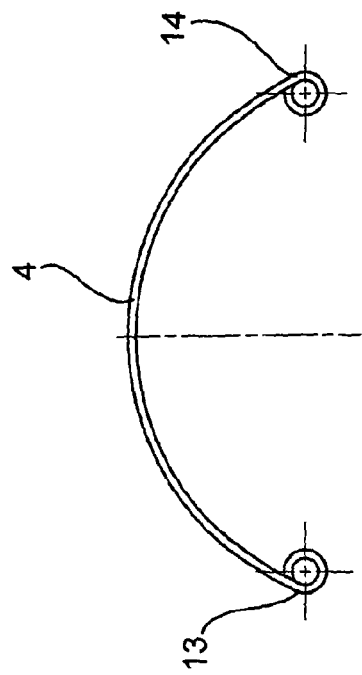# 
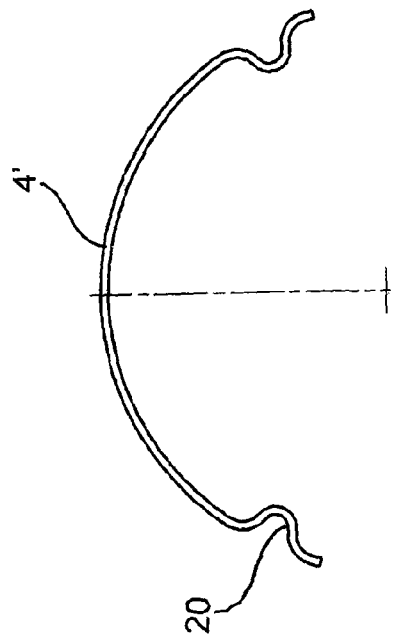
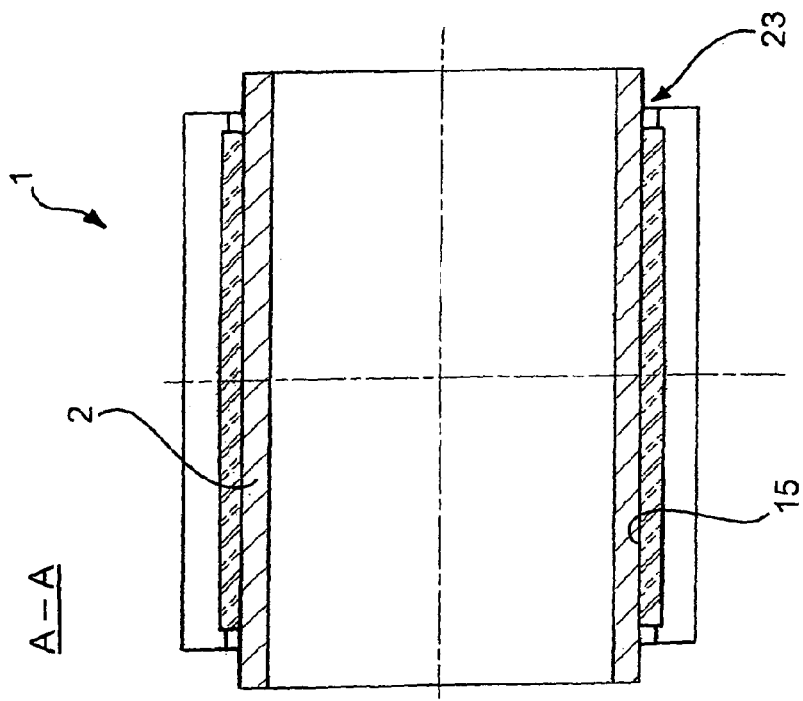

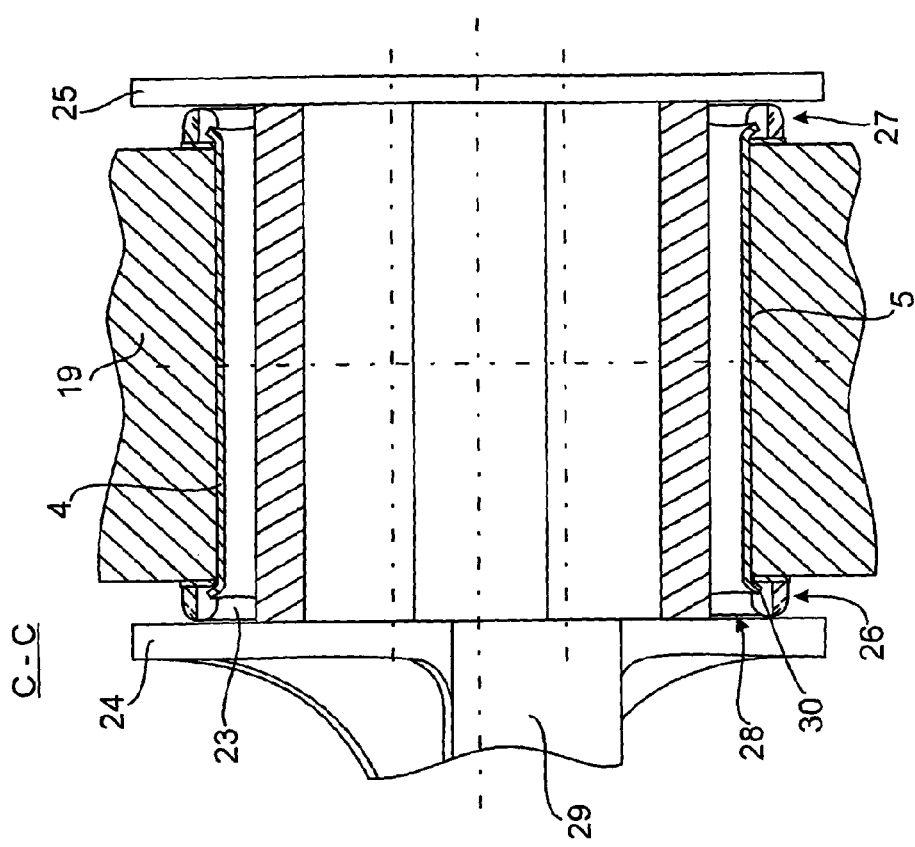
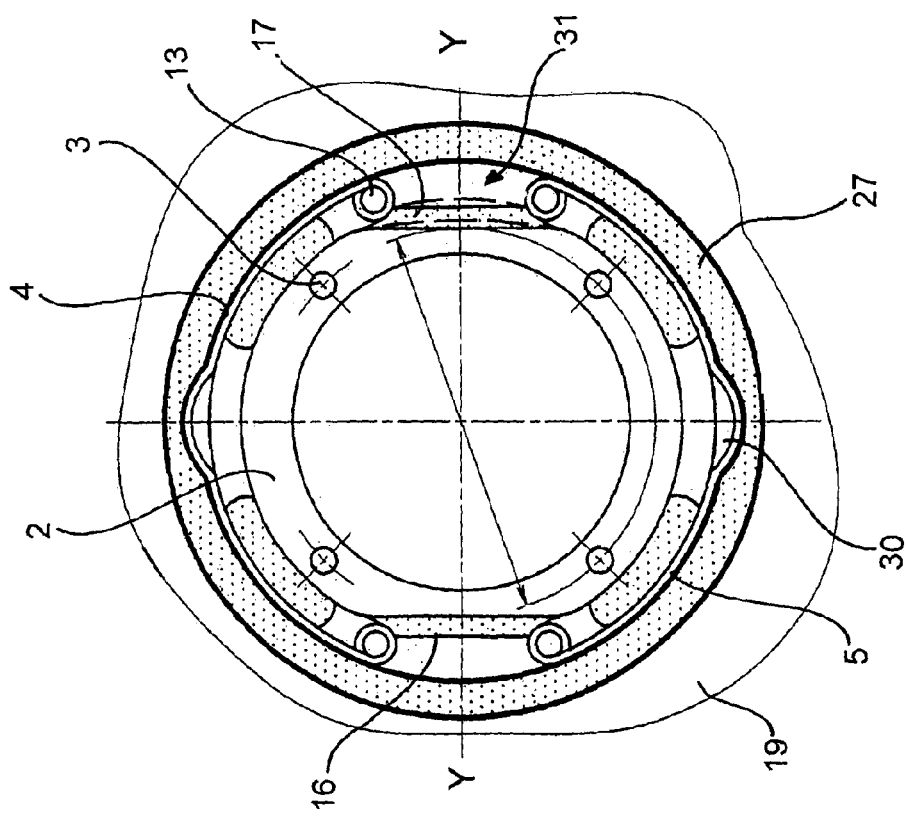

ELASTOMER METAL ELEMENT FOR AN ELASTOMER METAL BEARING, PARTICULARLY AS A BEARING CONNECTION BETWEEN A DOME MODULE AND A VEHICLE

CROSS-REFERENCE TO RELATED APPLICATIONS

This application is the U.S. national phase of PCT/EP2008/002559 filed Mar. 31, 2008, which claims priority of German Patent Application No. DE 10 2007 016 741.7 filed Apr. 7, 2007.

FIELD OF THE INVENTION

The invention involves a metal elastomer element for a metal elastomer bearing, particularly as a bearing connection between a dome module and a vehicle, according to the preamble of claim 1.

BACKGROUND OF THE INVENTION

A well-known generic metal elastomer element for a metal elastomer bearing (DE 19 55 308 C3) consists of an inner cylindrical metal component to form a connection with a first component to be supported and two outer sheet metal shells that lie opposite to each other and partially overlap the inner cylindrical metal component, whereas a bonded elastomer body is mounted between the inner metal component and the two sheet metal shells. By applying a radial preload in the elastomer body, the metal elastomer element can be pressed into a pivot eye joint at a second mounted component.

In the manufactured state, the known metal elastomer element features a distance between the respective opposite longitudinal edges of the sheet metal shells, as well as a wedge-shaped longitudinal slot in the elastomer material in this area. In the mounted state, while pressed into the pivot eye joint, these longitudinal slots are closed and the edges of the longitudinal sheet metal shells lie against each other, resulting in a completely circular cylindrical elastomer annular body as well as a circulatory sheet metal sleeve. In the mounted state this would result in torsional spring characteristics that rise approximately linear above the operationally tolerable torsion angle. Moreover, because of the fact that in the mounted state the elastomer body forms a permanently closed circle, which is progressively increasing at larger torsion angles, the metal elastomer element is relatively hard.

BRIEF DESCRIPTION OF THE INVENTION

In contrast it is the objective of the invention to propose a metal elastomer element for a metal elastomer bearing that has a torsional characteristic line which in the mounted state increases approximately linear over a certain torsional angle that originates from the unloaded state. In a further rotation corresponding to higher torque the torsional characteristics continue approximately in horizontal or preferably sloping manner.

This objective is achieved by means of the characteristics mentioned in claim 1.

According to claim 1, the metal elastomer element has in its mounted state a twisting stop which supports and accepts torsional forces up to a specific stop release moment and, consequently, up to a specific assigned torsion angle at relative high torsion resistance with approximately linear torsional spring characteristic. Above one of such torsional moments the twisting stop can be bridged at the stop release moment, whereby the stop support is completely or mostly released. As a result further torsional deflections over the stop release moment are absorbed with subsequent horizontal or sloping torsional characteristics. Consequently the torsional forces can be absorbed in the elastomer body only in molecular manner. Therefore the metal elastomer bearing has a relatively flexible design with regard to respectively larger torsional deflections.

A preferred application of such a metal elastomer bearing comprises a bearing connection between a dome module and a vehicle. In the process two four-wheel vehicles are each provided with a dome module and, if required, are connected to form one vehicle, whereas the dome modules are forming a platform as a passageway for people between the individual vehicles. In buses such a platform can be covered with large capacity bellows. The invention-based mounting should keep such a platform preferably in a horizontal position during normal driving in order to provide a comfortable and safe passageway for people. With the invention-based metal elastomer bearing this objective is achieved in that, during a rotation of the vehicles around the longitudinal axis of up to approximately 3° torsion angle, caused, for example, through a bumpy road, the movements of the vehicle are absorbed in almost linear manner with high torsional stiffness due to the function of the twisting stop. If, however, the interacting torsion angles are increased, for example, in the case of an accident, the otherwise relatively rigid connection should not become more rigid. Instead the twisting stop should be released and rotational loadings should be absorbed via continuing horizontal or sloping torsional spring characteristics. In this way, it is possible to prevent or at least reduce damages in the vehicle frame if, for example, in the case of an accident, the torsion angles along the longitudinal axis of the connected vehicles are relatively large.

Preferably the elastomer material used consists of rubber and the bonded compound is produced through a vulcanizing process. If required, instead of using metal, plastic material with comparable material properties can be used to produce the inner part and the shell parts.

In a preferred embodiment of a metal elastomer element according to claim 2, the longitudinal edges of the sheet metal shells form a retainer profile and are bent inward in radial direction in such a way that, even in compressed condition, a distance remains between the two longitudinal edges of the sheet metal shells that are opposite of each other in peripheral direction. In the region of such a distance, the respective inner metal component comprises a longitudinal cylindrical section to which a respective lengthwise elastomer stop has been solidly attached. In particular, such an elastomer stop can be designed as a longitudinal elastomer molding of similar size. If required it can also be slightly bulged outward in radial direction.

Each elastomer stop has longitudinal retainer stops on both sides. The assigned edges of the sheet metal shells with their retainer profile are attached to these longitudinal retainer stops in order to form a twisting stop in compressed and mounted condition. At the same time, the retainer profiles are supported with relatively high torsional stiffness and with approximately linear torsional spring characteristics up to a rotational loading with a specific stop release moment.

In torsional direction the retainer profile of the metal longitudinal edges and/or the longitudinal retainer stops have sloping bevels. If the rotational loading exceeds the stop release moment, the retainer profiles of the two loaded metal shell edges release the stop support, snap over the loaded longitudinal retainer stops and glide on the elastomer stops.

To allow this process to take place, a respective torsion tolerance has been provided between a retainer profile of a longitudinal edge of a sheet metal and an adjacent longitudinal elastomer body, as well as a slide on tolerance above the elastomer stops. After the retainer profile snaps and slides on the respective elastomer stop, other rotations are absorbed, preferably from as little as approximately 3° torsion angle with continuing horizontal and sloping torsional spring characteristics.

According to claim 3, the longitudinal edges of the sheet metal shells of a preferred embodiment of a retainer profile are designed as a rolled rim. Alternatively, it is possible to form a retainer profile by means of a radially inward-curled seam.

To allow the retainer profile to easily snap and glide on the elastomer stops, claim 4 proposes to design the retainer profile with a radial height of approximately half the diameter of the rolled rim or alternatively half the depth of the seam.

A further development according to claim 5 provides two respective longitudinal lamellar elastomer bodies between the inner metal component and the assigned sheet metal shell part, each of which is provided in peripheral direction with an intermediate distance and distances to the longitudinal edges of the sheet metal shells. If the metal elastomer element is mounted in horizontal direction and the twisting stops are arranged in horizontal cross direction, the protruding longitudinal lamellar arrangement of the elastomer bodies accomplishes that these are prominent in exerting compressive and propulsive force in vertical and cross direction. Especially in the preferred application, they will be prominent in forming a connection between a dome module and a vehicle in the case of two connected vehicles.

According to claim 6, threaded holes, which are offset against each other, have been provided at the front ends of the inner metal component in order to be able to mount side plates on both sides. If required these side plates can be part of the first component to be mounted. In a further development according to claim 7, the axial lengths of the sheet metal shell parts, the elastomer body and the elastomer stops are shorter than the inner cylindrical metal component. They are designed in such a way that both sides of the inner metal component have recesses with axial distances toward the adjacent side plates. Each front end of the sheet metal shell parts has an attached axial washer disc, which are supported axially to the longitudinal center of the bearing at a respectively shorter axial pivot eye joint. In this way, the axial washer discs can accept their stop function at the assigned side plate in the case of a bearing deflection, if required after passing through a gap. In the preferred application for the connection between a dome module and a vehicle, especially in an arrangement of four elastomer bodies according to claim 5, the bearing position in longitudinal direction of the vehicle is therefore arranged in flexible manner. However, it runs in axial direction against an axial stop which is drilled on both sides of the axial washer discs. Preferably such axial washer discs according to claim 8 are designed as elastomer discs or metal elastomer discs.

According to claim 9, if required, at least one sheet metal shell part can have a trim directed radially outward on at least one front end region by means of which a retaining element for the washer discs is formed, respectively.

Designing different gliding surfaces at the elastomer stops according to claim 8 provides possibilities for dimensioning the characteristic line.

BRIEF DESCRIPTION OF THE DRAWINGS

The invention is described in more detail by means of a drawing.

It is shown:
FIG. 1 a view of a manufactured metal elastomer element in axial direction,
FIG. 2 a longitudinal cut along the line B-B from FIG. 1,
FIG. 3 a longitudinal cut along the line A-A from FIG. 1,
FIG. 4 a first embodiment of the metal shell,
FIG. 5 a second embodiment of a metal shell,
FIG. 6 a view in axial direction of a metal elastomer bearing with a mounted metal elastomer element in an embodiment according to FIG. 1,
FIG. 7 a view according to FIG. 6, but with a metal elastomer element using a sheet metal embodiment according to FIG. 5,
FIG. 8 a view according to FIG. 7 in twisted position,
FIG. 9 a view in axial direction of a completely mounted metal elastomer bearing with axial washer discs, and
FIG. 10 a longitudinal cut along the line C-C from FIG. 9.

DETAILED DESCRIPTION OF THE INVENTION

Figure 7:
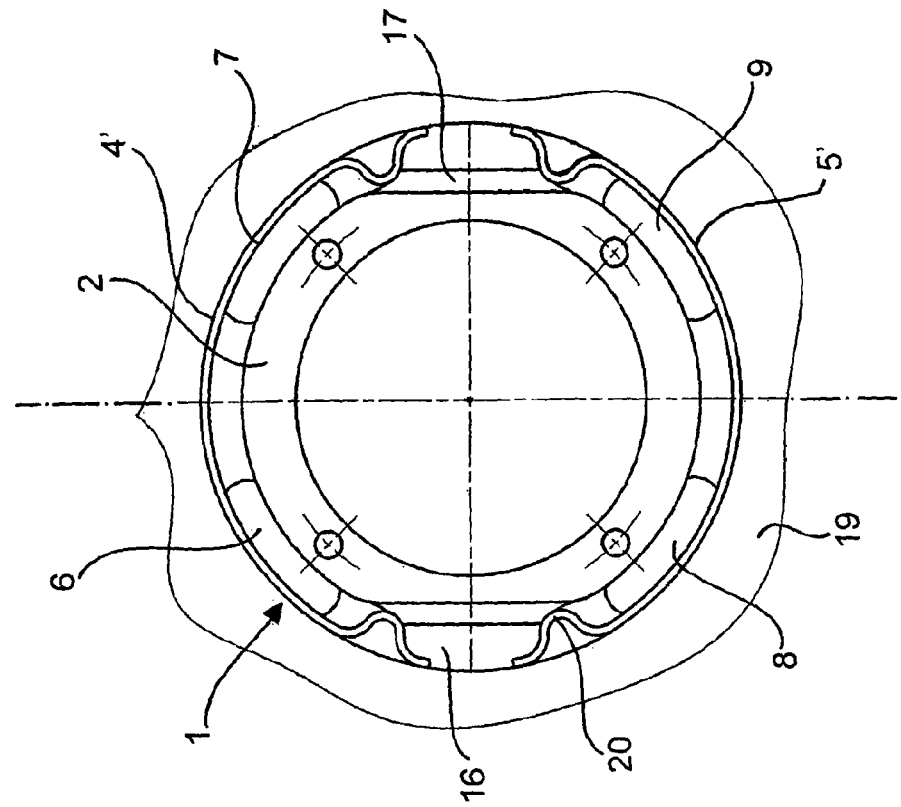

The axial view of FIG. 1 and the longitudinal cuts in FIGS. 2 and 3 show a metal elastomer element with an inner cylindrical metal component 2 which is designed as a thick-walled sturdy pipe and which forms a connection with a first component to be supported, for example, a dome module. Such connections can be formed by providing threaded holes 3, which are offset against each other, at the front ends of the metal component 2, and/or the metal component 2 is part of the adjacent component.

The metal elastomer element 1 also comprises two outer sheet metal shell parts 4, 5 that lie opposite to each other and partially overlap the inner cylindrical metal component, whereas bonded elastomer bodies 6, 7, 8 and 9 are mounted between the inner metal component 2 and the sheet metal shell parts 4, 5. At the same time, two respective longitudinal lamellar elastomer bodies 6, 7 are assigned to a sheet metal shell part 4, or elastomer bodies 8, 9 are assigned to the sheet metal shell part 5. An intermediate distance 10 lies between each elastomer body of a sheet metal shell part, and there is a distance 11 to an assigned longitudinal edge of a sheet metal shell.

The longitudinal edges of the sheet metal shell 12 are bent into a retainer profile, each forming a rolled rim 13. The sheet metal shell parts 4, 5 correspond to the embodiment of a manufactured sheet metal shell 4 shown in an axial view in FIG. 4.

There is a respective distance 14 between the respective opposite rolled rims 13. In this distance range both sides of the inner cylindrical metal component 2 feature on their opposite end a longitudinal cylindrical section 15. To each of these longitudinal cylindrical sections 15 a bonded longitudinal elastomer stop 16, 17 in the form of a longitudinal elastomer strip has been attached. Each elastomer stop 16, 17 has two opposite longitudinal retainer stops 18 which support the respectively assigned longitudinal edge of the sheet metal shell 12, in this case a rolled rim 13 in mounted and loaded condition. The longitudinal retainer stops 18 are inclined toward sloping bevels.

The radial height of both elastomer stops 16, 17 corresponds to approximately half of the diameter of the rolled rim 13.

Figure 6:
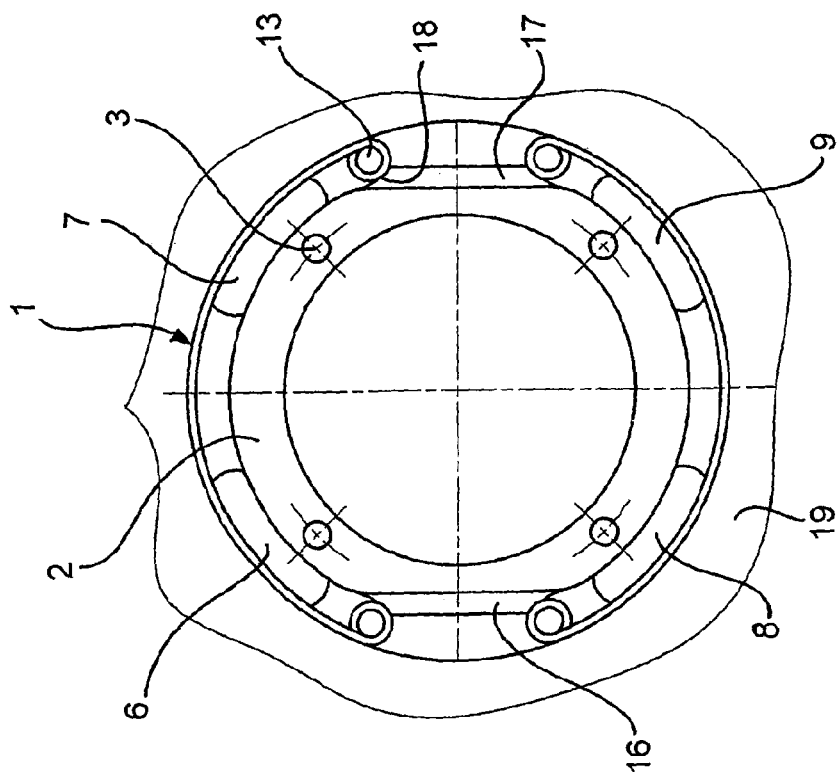

In FIG. 6 the metal elastomer element according to FIGS. 1 to 3 is pressed into a cylindrical pivot eye joint with a somewhat reduced diameter. As a result, the elastomer bodies 6, 7, 8, 9 with radial tensioning are to a certain extent warped, and the rolling rims 13 are attached to the longitudinal retainer stops 18 of the elastomer stops 16 and 17.

FIG. 7 shows basically the same embodiment as FIG. 6. The only difference is that each longitudinal edge of the sheet metal shells 12 of the sheet metal shell parts 4', 5', is provided with a retainer profile consisting of radially inward pointing lengthwise arched seams 20. Consequently, the sheet metal shell parts 4' used in FIG. 7 are similar to the one that is shown in manufactured state and in axial view in FIG. 5.

Figure 8:
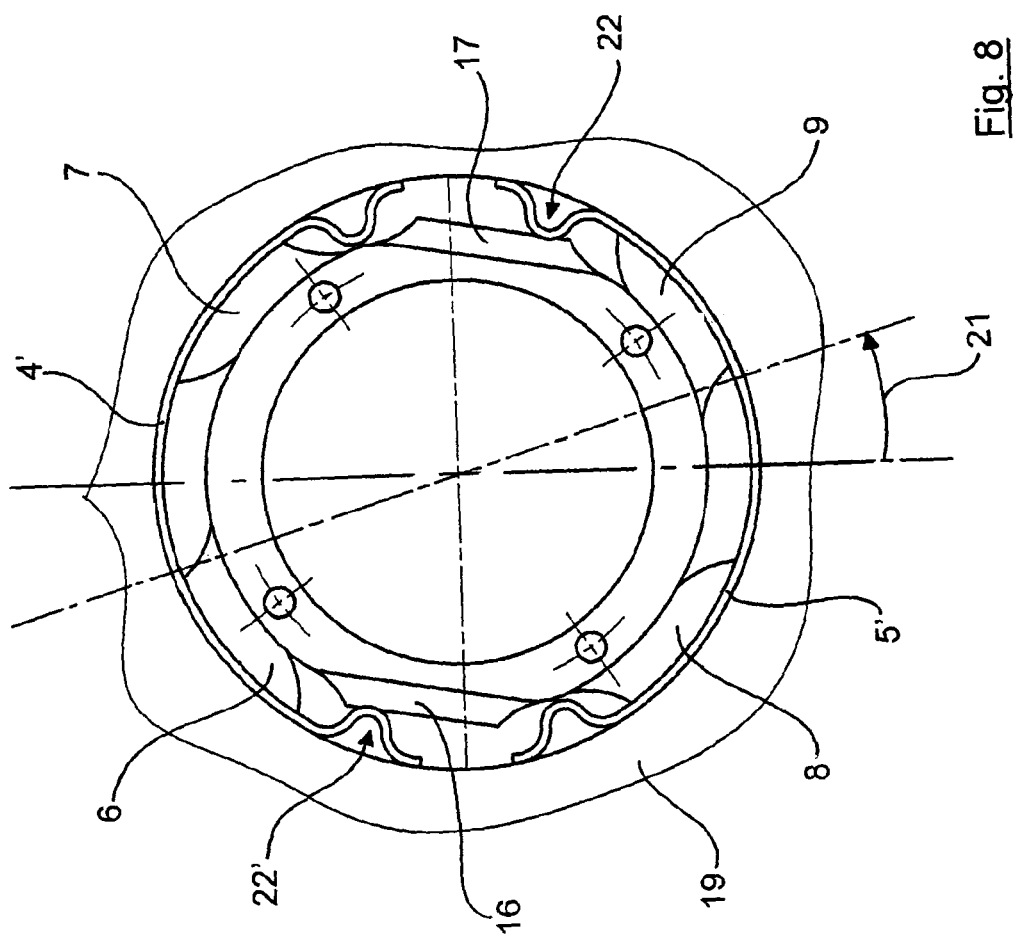

FIG. 8 shows how such a completely mounted metal elastomer bearing functions with regard to rotational loading according to arrow 21: Here the elastomer stops 16, 17 together with the lengthwise seams 20 form twisting stops which maintain their function up to a specific rotational loading, which results in relatively high torsional stiffness even if the torsion angles are small. Positions 22 and 22' show that over a specific rotational loading according to a stop release moment, the stop support is bridged in that the retainer profile, here the respective loaded lengthwise seams 20, glides on the respective elastomer stop 16, 17. As a result the twisting stop function of the elastomer stops 16, 17 is neutralized, and the rotational loading is exclusively absorbed with approximately horizontal or preferably sloping torsional spring characteristics in the deforming elastomer bodies 6, 7, 8, 9.

FIGS. 2, 3 and 10 show that the axial lengths of the sheet metal shell parts 4, 5 or 4', 5', of the elastomer bodies 6, 7, 8, 9 and the elastomer stops 16, 17 are shorter than the axial lengths of the inner metal component 2, each of which is provided with a recess 23 on both sides. FIGS. 8 and 9 show that side plates 24, 25 have been screwed or molded on both sides of the front ends of the inner metal component 2, whereas the axial recesses 23 provide distances for the adjacent side plates 24, 25. Furthermore, washer discs 26, 27 of the type of elastomer discs are attached to each front end of the sheet metal shell parts 4, 5 or 4', 5' which, as shown in FIG. 10, axially overlap the sheet metal shell parts 4, 5 or 4', 5' and which are supported axially toward the inside on a respectively shorter pivot eye joint 19. The axial size of each axial washer discs 26, 27 is a little smaller than the axial extent of the distance between the front ends of the pivot eye joint 19 and the side plates 24, 25, which results in the fact that a gap 28 remains between each side plate 24, 25 and the axial washer discs 26, 27. Consequently, the axial washer discs 26, 27 accept their stop function at a relatively low axial bearing deflection according to the size of the gap 28. However, in axially unloaded condition, if required, the washer discs 26, 27 can also be attached directly to the side plates 24, 25.

The side plates 24, 25 are rigidly connected with the first component to be supported, for example, a dome module 29, whereas the pivot eye joint 19 is a component of an assigned vehicle body.

Moreover, FIGS. 9 and 10 show that the sheet metal shell parts 4, 5 comprise in the region of each front end two opposite trims 30 which are directed radially to the outside.

FIG. 9 shows an alternative model of the elastomer stops 16, 17 (dotted line at the elastomer stop 17) in which the glide surface for the rolled rim 13 can be bulged somewhat to the outside after a stop gap. It is important that even here, despite the bulge, sufficient glide distance 31 is provided for a rolled rim 13 or a lengthwise seam 20 between the elastomer stops 16, 17 and the pivot eye joint.

What is claimed is:

1. A metal elastomer element for a metal elastomer bearing, said metal elastomer element comprising:
    an inner cylindrical metal component which forms a connection with a first component to be supported;
    two outer sheet metal shell parts that lie opposite to each other and partially overlap the inner cylindrical metal component;
    a plurality of bonded elastomer bodies which are mounted between the inner metal component and the two outer sheet metal shell parts, so that by applying a radial preload in the elastomer bodies, said metal elastomer element can be pressed into a pivot eye joint at a second mounted component; and
    a twisting stop which provides a specific stop release moment up to which the metal elastomer bearing has relatively high torsional stiffness with approximately linear torsional spring characteristics, and which can be bridged by releasing the twisting stop whereby further torsional deflections over the stop release moment are absorbed with subsequent horizontal or sloping torsional characteristics.

2. A metal elastomer element according to claim 1, characterized in that said two outer sheet metal shell parts include longitudinal edges which form a retainer profile and are bent inward in radial direction so that a distance remains even in compressed condition between said longitudinal edges of the two outer sheet metal shell parts that are opposite of each other in peripheral direction,
    wherein each inner metal component comprises a longitudinal cylindrical section to which a respective lengthwise elastomer stop has been solidly attached;
    wherein on both sides of a longitudinal retainer stop portion of each elastomer stop, the respective edges of the two outer sheet metal shell parts with their retainer profile are attached so as to place said twisting stop in a compressed condition, so as to be supported with relatively high torsional stiffness and with approximately linear torsional spring characteristics up to a rotational loading with a specific stop release moment;
    and wherein the retainer profile of the longitudinal edges of the two outer sheet metal shell parts and/or the longitudinal retainer stops have sloping bevels in torsional direction, so that if the rotational loading exceeds the stop release moment, the respective retainer profiles of the two loaded outer sheet metal shell part edges release the twisting stop support, snap over the loaded longitudinal retainer stop portions and glide on the elastomer stops, and wherein a respective torsion tolerance has been provided between a retainer profile of a longitudinal edge of a sheet metal shell part and an adjacent longitudinal elastomer body, as well as a slide on tolerance above the elastomer stops, said element being configured and operable so that after the retainer profile snaps and slides on the respective elastomer stop, other rotations are absorbed with continuing horizontal and sloping torsional spring characteristics.

3. A metal elastomer element according to claim 2, characterized in that the longitudinal edges of the sheet metal shell parts are either coiled into a rolled rim to form the retainer profile and the sloping bevels, or they comprise a radially inward pointing seam.

4. A metal elastomer element according to claim 3, characterized in that the radial height of both lengthwise elastomer stops corresponds to approximately half the diameter of the rolled rim or approximately half the depth of the lengthwise seam.

5. A metal elastomer element according to claim 1, characterized in that said bonded elastomer bodies are each disposed between the inner metal component and a respective one of said sheet metal shell parts and are provided with an intermediate distance and distances to the longitudinal edges of the sheet metal shell parts.

6. A metal elastomer element according to claim 1, characterized in that threaded holes, which are offset against each other, have been provided at each of the front ends of the inner metal component in order to be able to mount side plates on both sides which side plates, if required, can be part of the first component to be mounted.

7. A metal elastomer element according to claim 6, characterized in that the axial lengths of the sheet metal shell parts, the elastomer body and the elastomer stops are shorter than the inner cylindrical metal component and are configured so that both sides of the inner metal component have recesses with axial distances toward the adjacent side plates, and each front end region of the sheet metal shell parts has an attached axial washer disc which is supported axially to a longitudinal center of the bearing at the pivot eye joint which is respectively shorter in axial direction than the sheet metal shell parts, so that the axial washer discs can accept their stop function at a respective one of said side plates in the case of an axial bearing deflection, if required after passing through a gap.

8. A metal elastomer element according to claim 7, characterized in that the axial washer discs are elastomer discs or metal elastomer discs.

9. A metal elastomer element according to claim 1, characterized in that at least one of said sheet metal shell parts can have a trim directed radially outward on at least one front end region in order to secure the assigned axial washer discs.

10. A metal elastomer element according to claim 1, characterized in that it includes a glide surface for a longitudinal edge of at least one of the sheet metal shell parts, which glide surface is bulged on the elastomer stops.

* * * * *